(No Model.)

M. MARTIN.
DRAFT EQUALIZER.

No. 604,902. Patented May 31, 1898.

Witnesses
Mark L. Byng.
James F. Duhamel

Inventor
Miles Martin
By John Wedderburn
Attorney

UNITED STATES PATENT OFFICE.

MILES MARTIN, OF MARSHALL, INDIANA.

DRAFT-EQUALIZER.

SPECIFICATION forming part of Letters Patent No. 604,902, dated May 31, 1898.

Application filed April 29, 1897. Serial No. 634,416. (No model.)

*To all whom it may concern:*

Be it known that I, MILES MARTIN, a citizen of the United States, residing at Marshall, in the county of Parke and State of Indiana, have invented certain new and useful Improvements in Equalizers; and I do hereby declare the following to be a full, clear, and exact description of the invention, such as will enable others skilled in the art to which it appertains to make and use the same.

My invention relates to equalizers; and the object of the same is to provide an improved form of equalizer attachment in which the pull of the central horse shall be equalized by the pull of the two outside horses.

My invention consists in the novel features of construction hereinafter more particularly set forth and claimed.

Figure 1:
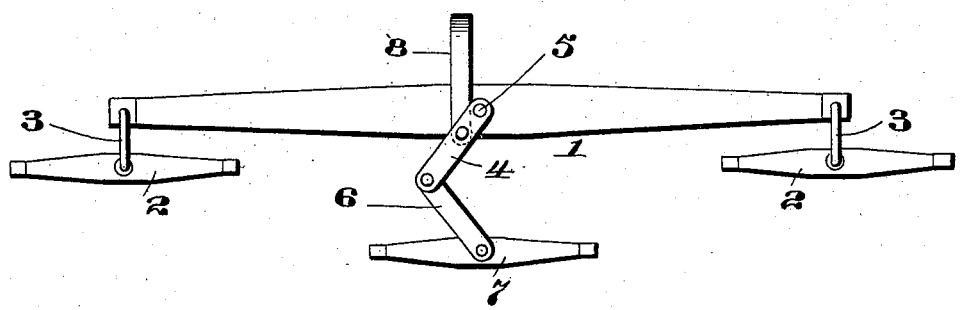
Figure 2:
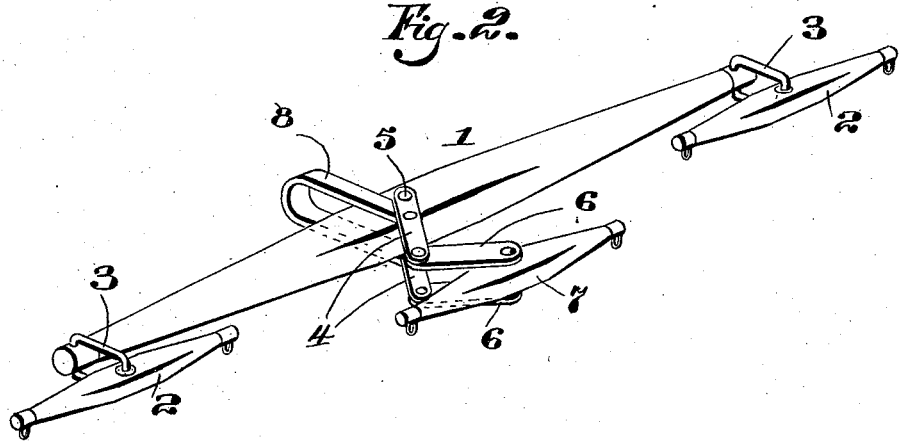

In the accompanying drawings, forming a part of this specification, Figure 1 is a top plan view of my improved equalizer, and Fig. 2 is a perspective view thereof.

Referring by numerals to the drawings, 1 designates a tripletree, or it might be a doubletree which it was desired to convert by means of my improved attachment into an equalizing device for more than two horses.

2 2 are the singletrees, connected by links 3 with the extremes of the triple or main tree in the usual manner.

Coming now more particularly to the present invention, 4 4 are two levers pivoted at 5 to the top and bottom of the main tree at about the center of its length and extending thence obliquely forward, and 6 6 are two links pivotally connecting the front ends of these levers with the center of an intermediate singletree 7, adapted for the use of the central horse of the trio. These links 6 stand oblique and carry the central pivot of the singletree 7 to a point about in front of the central pivot 5 of the main tree 1.

The numeral 8 designates a yoke or clevis whose body stands astride the main tree, whose front ends are pivoted to the levers 4 4 about two-thirds of the distance back from the forward pivots to the rear pivots 5, and whose rear end is connected with the splinter bar or pole of the vehicle in any suitable manner, not necessary to be shown here, as it forms no essential part of the present invention.

Upon examination of the drawings it will be plain that whenever the central horse exerts a greater force than the horses upon the outside the tripletree will draw back upon the singletrees, to which the outside horses are attached, and conversely whenever the outside horses exert a greater force than the inside horse the tripletree will draw back upon that horse. Thus the pull of the inside horse will be equalized with that of the two outside horses. Further, should one of the outside horses pull more than the other outside horse it will be readily seen that my arrangement is such that the tripletree will then act as an ordinary doubletree.

It is obvious that means may be provided to allow for a stronger or weaker horse in the center—as, for instance, by shifting the pivot-point of the attachment of the evener or by shifting the pivot of the attachment to the tripletree. I have not, however, deemed it necessary to show such a device here, as it is such as could be readily conceived by any one possessed of ordinary mechanical knowledge. I do not, therefore, desire to confine myself to the exact form here shown and described, but wish to embrace in my invention all forms which usually embody the same general characteristics as herein shown and described.

Having thus described my invention, what I claim as new, and desire to secure by Letters Patent, is—

1. In a three-horse evener, the combination with the tripletree, and two singletrees connected by links with its ends; of a lever pivoted at its rear end to the center of the tripletree and extending thence obliquely forward, a link pivoted to the front end of this lever and extending obliquely forward in the opposite direction, an intermediate singletree pivoted to the front end of the link, and pivotal connections between the vehicle and a point on the lever one-third the distance on the latter between its pivot to the tripletree and its pivot to said link, as and for the purpose set forth.

2. The herein-described equalizer attachment, the same comprising a pair of levers having their rear ends adapted to be pivoted to the center of the main tree and extending thence obliquely forward, a pair of links pivoted to the front ends of the levers and extending thence obliquely forward in the opposite direction, a singletree pivoted between the front ends of said links, and a yoke whose body is adapted to span the main tree, whose rear end is adapted to be connected with the vehicle, and whose front ends are pivoted to said levers at a point one-third the distance from the rear to the front pivots of the latter, as and for the purpose set forth.

In testimony whereof I have signed this specification in the presence of two subscribing witnesses.

MILES MARTIN.

Witnesses:
P. F. OWEN,
J. H. HARRISON.